United States Patent
Zhu (10) Patent No.: US 11,856,379 B2
(45) Date of Patent: Dec. 26, 2023

(54) METHOD, DEVICE AND ELECTRONIC DEVICE FOR CONTROLLING AUDIO PLAYBACK OF MULTIPLE LOUDSPEAKERS

(71) Applicant: BEIJING HORIZON ROBOTICS TECHNOLOGY RESEARCH AND DEVELOPMENT CO., LTD., Beijing (CN)

(72) Inventor: Changbao Zhu, Beijing (CN)

(73) Assignee: BEIJING HORIZON ROBOTICS TECHNOLOGY RESEARCH AND DEVELOPMENT CO., LTD., Beijing (CN)

(*) Notice: Subject to any disclaimer, the term of this patent is extended or adjusted under 35 U.S.C. 154(b) by 195 days.

(21) Appl. No.: 17/434,208

(22) PCT Filed: Nov. 27, 2019

(86) PCT No.: PCT/CN2019/121332
§ 371 (c)(1),
(2) Date: Aug. 26, 2021

(87) PCT Pub. No.: WO2020/173156
PCT Pub. Date: Sep. 3, 2020

(65) Prior Publication Data
US 2022/0217468 A1     Jul. 7, 2022

(30) Foreign Application Priority Data

Feb. 27, 2019    (CN) .......................... 201910146599.2

(51) Int. Cl.
*H04S 7/00*     (2006.01)
*H04R 3/12*     (2006.01)
(Continued)

(52) U.S. Cl.
CPC ................ *H04R 3/12* (2013.01); *G10L 15/25* (2013.01); *G10L 15/30* (2013.01); *H04S 7/302* (2013.01); *H04R 2420/03* (2013.01)

(58) Field of Classification Search
None
See application file for complete search history.

(56) References Cited

U.S. PATENT DOCUMENTS

2004/0076302 A1* 4/2004 Christoph .............. H03G 5/165
                                                                381/108
2009/0055180 A1* 2/2009 Coon .................. B60R 16/0373
                                                                704/251
(Continued)

FOREIGN PATENT DOCUMENTS

CN         101064975 A     10/2007
CN         101426171 A      5/2009
(Continued)

OTHER PUBLICATIONS

Search Report of Chinese Application No. 2019101465992 dated Jun. 30, 2021, 5 pages.

*Primary Examiner* — James K Mooney
(74) *Attorney, Agent, or Firm* — Brooks Kushman P.C.

(57) ABSTRACT

Disclosed are a method, an apparatus and an electronic device for controlling audio playback of multiple loudspeakers, wherein the method comprises: determining the location information of each speaker and voice signals issued by each speaker; determining the area where each speaker is located according to the location information of each speaker; determining voice instruction corresponding to each voice signal; and controlling the multiple loudspeakers to play the audio indicated by the corresponding voice instruction respectively for the area where the speaker of each voice instruction is located. According to the method and apparatus and/or the electronic device in an embodiment of the present disclosure, different audios can be played for different areas in a preset space.

14 Claims, 5 Drawing Sheets

(51) Int. Cl.
    *G10L 15/25*     (2013.01)
    *G10L 15/30*     (2013.01)

(56) References Cited

U.S. PATENT DOCUMENTS

| | | | |
|---|---|---|---|
| 2009/0304205 | A1 | 12/2009 | Hardacker et al. |
| 2016/0021478 | A1 | 1/2016 | Katagiri |
| 2017/0026764 | A1* | 1/2017 | Rajendran ................ H03G 3/32 |
| 2017/0323639 | A1* | 11/2017 | Tzirkel-Hancock ... H04R 5/023 |
| 2018/0190282 | A1* | 7/2018 | Mohammad ......... G10K 11/178 |
| 2021/0053516 | A1* | 2/2021 | Andersson .............. G06F 3/167 |

FOREIGN PATENT DOCUMENTS

| | | |
|---|---|---|
| CN | 104508737 A | 4/2015 |
| CN | 105453174 A | 3/2016 |
| CN | 105957519 A | 9/2016 |
| CN | 106162436 A | 11/2016 |
| CN | 106303843 A | 1/2017 |
| CN | 107918637 A | 4/2018 |
| CN | 107993671 A | 5/2018 |
| CN | 109168112 A | 1/2019 |
| CN | 109379671 A | 2/2019 |
| JP | 2000003182 A | 1/2000 |

\* cited by examiner

METHOD, DEVICE AND ELECTRONIC DEVICE FOR CONTROLLING AUDIO PLAYBACK OF MULTIPLE LOUDSPEAKERS

CROSS-REFERENCE TO RELATED APPLICATIONS

This application is the national phase of PCT Application No. PCT/CN2019/121332 filed on Nov. 27, 2019, which claims priority to Chinese Patent Application No. 201910146599.2, filed on Feb. 27, 2019, the disclosures of which are hereby incorporated in their entireties by reference herein.

TECHNICAL FIELD

The present disclosure generally relates to the technical field of sound signal processing, and in particularly, relates to a method, apparatus and electronic device for controlling audio playback of multiple loudspeakers.

BACKGROUND

Some car audio systems can play audio in response to voice instructions issued by the driver in the driver seat and passengers in the front passenger seat.

For example, in response to the voice instruction "navigate to the train station" issued by the driver and the voice instruction "play music" issued by the passenger in the front passenger seat, the car audio system can control the in-car loudspeakers to simultaneously play navigation sound and music.

SUMMARY

According to an aspect of the present disclosure, a method for controlling audio playback of multiple loudspeakers is provided. The method may include: determining location information of each speaker and a voice signal issued by each speaker; determining an area where each speaker is located according to the location information of each speaker; determining a voice instruction corresponding to each voice signal; and controlling multiple loudspeakers to play audio indicated by a corresponding voice instruction for an area where a speaker of each voice instruction is located respectively.

According to another aspect of the present disclosure, an apparatus for controlling audio playback of multiple loudspeakers is also provided. The apparatus may include: a sound source localization module, configured to determine location information of each speaker and a voice signal issued by each speaker; an area determination module, configured to determine an area where each speaker is located according to the location information of each speaker; a voice recognition module, configured to determine a voice instruction corresponding to each voice signal; and a playback control module, configured to control multiple loudspeakers to play audio indicated by a corresponding voice instruction for an area where a speaker of each voice instruction is located respectively.

According to another aspect of the present disclosure, an electronic device is also provided. The electronic device may include: a processor configured to execute the foregoing method; and a memory configured to store executable instructions of the processor.

According to another aspect of the present disclosure, there is also provided a computer-readable storage medium having stored thereon program instructions, which can execute the foregoing method when executed by a computer.

Through the method, apparatus and/or electronic device according to the embodiments of the present disclosure, different audios can be played for different areas in a predetermined space such as an in-vehicle space, and different audios played in different areas do not interfere with each other.

BRIEF DESCRIPTION OF THE DRAWINGS

Through a more detailed description of the embodiments of the present disclosure in conjunction with the accompanying drawings, the above and other objectives, features, and advantages of the present disclosure will become more apparent. The accompanying drawings are used to provide a further understanding of the embodiments of the present disclosure, and constitute a part of the specification, which explain the present disclosure together with the embodiments of the present disclosure, but do not constitute a limitation to the present disclosure. In the drawings, the same reference numerals generally represent the same components or steps.

DETAILED DESCRIPTION

Hereinafter, exemplary embodiments according to the present disclosure will be described in detail with reference to the accompanying drawings. Obviously, the described embodiments are only a part of the embodiments of the present disclosure, rather than all the embodiments of the present disclosure, and it should be understood that the present disclosure is not limited by the exemplary embodiments described herein.

Overview

As mentioned above, the general in-car audio system can respond to one or more voice instructions issued by the driver and/or the passenger in the front passenger seat, and control multiple loudspeakers to play multiple audios (for example, navigation sound, music, etc.). In this occasion, multiple audios played at the same time may be mutually interfered with each other. For example, the driver may not be able to clearly hear the navigation audio due to the music played according to the voice instruction of the passenger in the passenger seat.

The method, apparatus, electronic device, etc., according to the embodiments of the present disclosure aim to solve or alleviate the above technical problems.

Exemplary System

Figure 1:
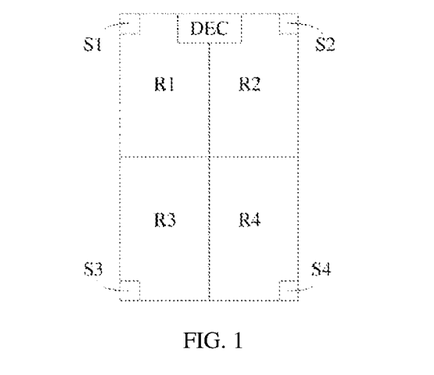
FIG. 1 shows an exemplary system according to an embodiment of the present disclosure.

For convenience of description, an exemplary system to which the method or apparatus according to the embodiments of the present disclosure can be applied is firstly shown in FIG. 1.

In the example of FIG. 1, the system may be a system in a vehicle-mounted environment inside a vehicle, where S1 to S4 represent four loudspeakers arranged at four corners of the vehicle, R1 to R4 represent four playing areas (hereinafter also referred to as "zones" for short) corresponding to the four seats inside the vehicle, and DEC represents a device according to an embodiment of the present disclosure or a device capable of implementing a method according to an embodiment of the present disclosure.

For example, the loudspeakers S1 to S4 can be connected to the device DEC in a wired or wireless manner, and in various embodiments of the present disclosure, the loudspeakers S1 to S4 can play corresponding audio with corresponding parameters under the control of the device DEC. For example, the loudspeaker S1 can play navigation audio for the area R1 under the control of the device DEC, the loudspeaker S2 can play news for the area R2 under the control of the device DEC, and the loudspeaker S3 and the loudspeaker S4 can play songs for the area R2 under the control of the device DEC.

It should be understood that the arrangement of the loudspeakers and device DEC in FIG. 1 is only an example. The method and apparatus according to the embodiments of the present disclosure can be used to control any number of multiple (at least two) loudspeakers in any configuration. In addition, each loudspeaker mentioned herein may also mean a loudspeaker array including one or more loudspeakers, or any other type of audio playback device or system capable of playing audio under the control of the device DEC. For example, the loudspeaker S1 can also be a loudspeaker array including multiple loudspeakers.

Although four adjacent and non-overlapping rectangular planar areas for S1 to S4 are shown in FIG. 1, the actual number of areas may not be limited to four, and the actual areas may be regular or irregular, overlapped or not overlapped with each other, in the form of plane or three-dimensional region or any other forms. For example, the number and shape of areas may depend on the number and configuration of loudspeakers.

In addition, the system or environment to which the method or device according to the embodiments of the present disclosure can be applied is not limited to an in-vehicle environment or an in-vehicle system. For example, the method or device according to the embodiments of the present disclosure may also be applied to other systems or environments such as home indoor environment and smart home system.

Figure 2:
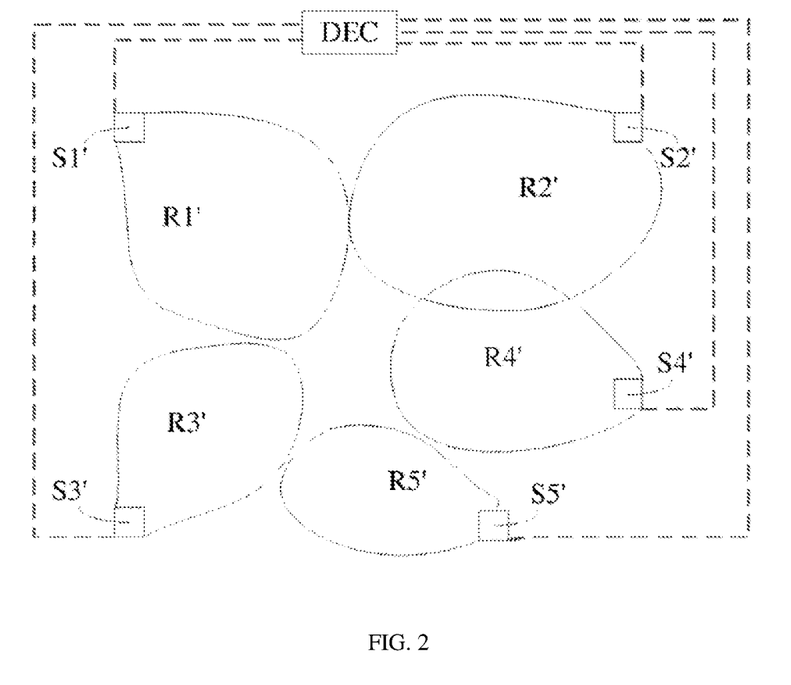
FIG. 2 shows an exemplary system according to an embodiment of the present disclosure.

For example, as shown in FIG. 2, five loudspeakers S1' to S5' can be placed in an indoor environment and connected to the device DEC according to the embodiment of the present disclosure in a wired or wireless manner, so that the five loudspeakers S1' to S5' can play corresponding audio under the control of the device DEC for the regions R1' to R5' respectively.

In the example of FIG. 2, in order to enable the region R2' to cover the listener's main listening area in the region R2', so as to ensure that the listener in the region R2' can hear the corresponding audio in most cases in the region R2' without being disturbed, the regions R2' and R4' can be allowed to partially overlap. According to different embodiments, the area and shape of each corresponding region R2' and R4' can be adjusted by adjusting the configuration of each loudspeaker R2' and R4' or by techniques such as beamforming, so as to avoid or minimize such overlap. In one embodiment, if such an overlapping area is not the main listening area; for example, it is not the listener's main activity area or main stay area, such as a wall, aisle, or the like, such an overlapping area can be ignored. In addition, within the allowable range of tolerances, there may actually be similar slightly overlapping parts between each area.

In addition, as shown in FIG. 2, in a predetermined environment, there may be "blind areas" not covered by R1' to R5'. If, according to statistics, observations or settings, it can be determined that the listener is unlikely to appear in this area or does not expect to hear any audio in this area, then such blind areas may not be considered; otherwise, for example, another loudspeaker can be set for such area, or the positions and parameters of the existing loudspeakers R1' to R5' can be adjusted, so that such area is covered.

In other words, according to the situation, the number of loudspeakers can be appropriately increased or decreased, or the configuration of each loudspeaker can be adjusted, or other appropriate means can be adopted, so as to realize the desired playback zones. The present disclosure is not limited to the configuration of the loudspeakers and the corresponding playback zones.

Exemplary Methods

Figure 3:
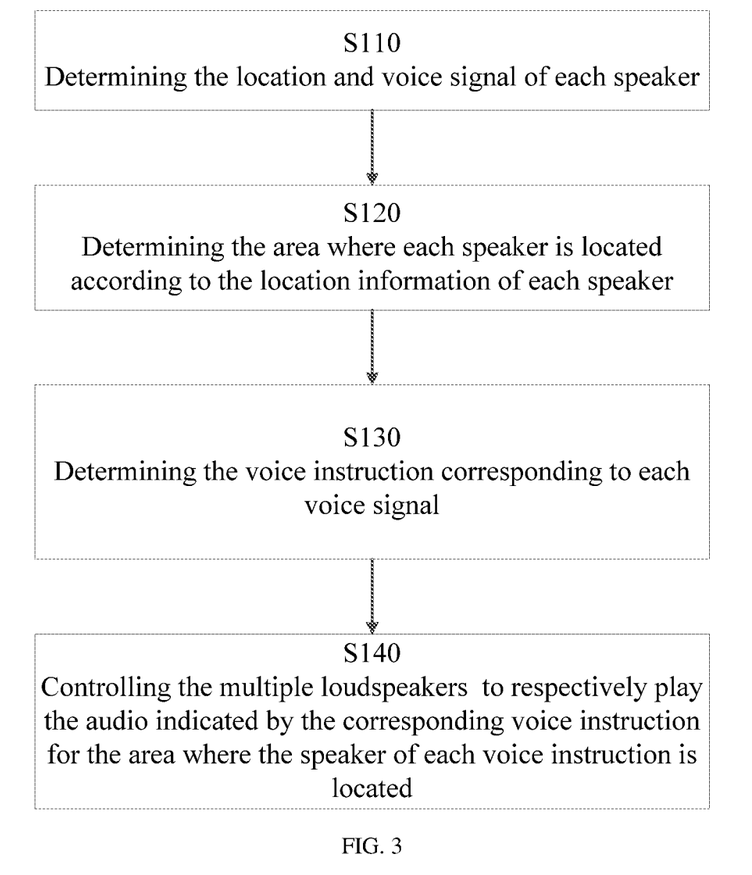
FIG. 3 shows an exemplary method according to an embodiment of the present disclosure.

FIG. 3 shows an example method for controlling multiple loudspeakers to play audio according to an embodiment of the present disclosure. The method may be applied to an electronic device and may include steps S110, S120, S130, and S140.

In step S110, the location and voice signal of each speaker can be determined.

According to different embodiments, in step S110, the location and voice signal of each speaker in the predetermined environment can be determined in any appropriate manner. For example, the sound signal in a predetermined environment (for example, a vehicle-mounted environment) can be received through a microphone (or a microphone array), and then the sound source position can be determined by a technique such as blind source separation, and the voice signal corresponding to each sound source can be separated.

According to the embodiments of the present disclosure, it is also possible to combine audio analysis with information analysis collected via other sensors to determine the position and voice signal of each speaker in a predetermined environment, which can remove or significantly reduce the influence of noise in the environment.

Then, the area where each speaker is located can be determined according to the location information of each speaker in step S120. For example, it is possible to determine an area of a circle, a rectangle, etc., centered on the position of the speaker and having a predetermined coverage as the area where the speaker is located. For example, it is also possible to determine the area where each speaker is located according to a predetermined correspondence relationship between the speaker's position and the predetermined area. For example, in the case where the position coordinate of the speaker is within a certain predetermined area, the area where the speaker is located can be determined as the predetermined area.

Then, the voice instruction corresponding to each voice signal can be determined in step S130.

According to different embodiments, in step S130, voice recognition can be implemented using of any appropriate technical means. For example, template matching methods such as hidden Markov model, dynamic time warping, and vector quantization can be used; methods based on phonetics and acoustics can also be used, and methods based on artificial neural networks can also be used. The present disclosure is not limited to any specific voice recognition technology.

Then, in step S140, the multiple loudspeakers may be controlled to respectively play the audio indicated by the corresponding voice instruction for the area where the speaker of each voice instruction is located.

Figure 4:
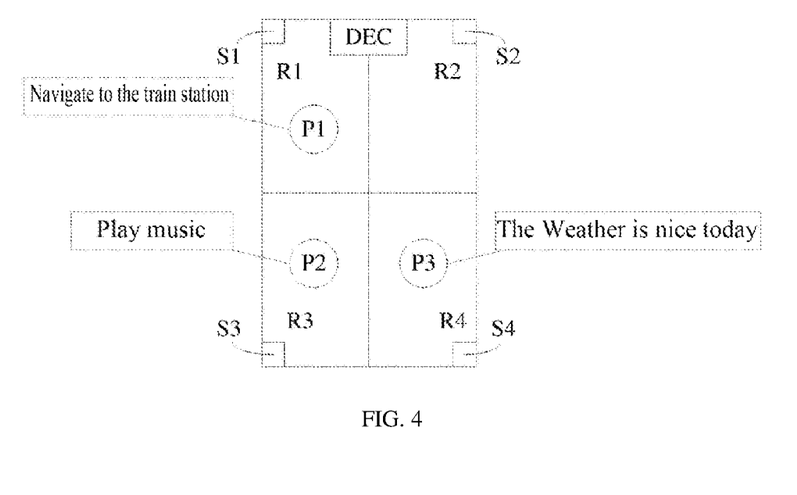
FIG. 4 shows an example of an execution process of an exemplary method according to an embodiment of the present disclosure.

For example, as shown in FIG. 4, in the exemplary vehicle-mounted environment of FIG. 1, there are three people P1 to P3, where P1 is located in the seat at area R1, P2 is located in the seat at area R3, and P3 is located in the seat at area R4. And the method according to the embodiment of the present disclosure may be executed automatically after the vehicle is started, or be executed according to, for example, manual operation or voice instruction of the driver and/or passengers.

In the example of FIG. 4, three talking people are detected in step S110, and the area where each speaker is located is determined in step S12, where P1 located in R1 says "Navigate to the train station", P2 located in R3 says "Play music", and P3 located in R4 says "The weather is nice today"; and in step S130, it is detected that P1 issued a voice instruction indicating "Navigate to the train station" and P2 issued a voice instruction indicating "Play music".

Therefore, in step S140, at least the loudspeaker S1 can be controlled to play navigation sounds with appropriate parameters (such as volume, power), and at least the loudspeaker S3 can be controlled to play music with appropriate parameters (such as volume, power).

Through the example method according to the embodiment of the present disclosure, different audios can be played for different areas in a predetermined space such as a vehicle-mounted space, and different audios played for different areas (at least the main listening area) do not interfere with each other.

More details of example methods according to embodiments of the present disclosure are described below.

In an embodiment, the method according to an embodiment of the present disclosure may further include: determining at least one predicted location; acquiring an image of the aforementioned at least one predicted location captured by an image sensor; determining at least one lip mover based on the captured image; and determining each speaker from the aforementioned at least one lip mover.

In one embodiment, for example, at least one sensor of one or more types, such as a human proximity sensor, a human activity detector, a pressure sensor, etc., may be placed at each predetermined location in a predetermined environment, and then sensing information of at least one placed sensor may be received, and the location and corresponding area of at least one person in the environment may be determined according to the received sensing information. Then, when determining the location and voice signal of each speaker, the voice signal collected by the sound sensor (for example, a microphone) can be separated according to each person's location, and the speaker's location and voice signal can be output.

In another embodiment, for example, at least one predicted location (or at least one possible playback area) may also be determined, and for example, an image (the term "image" mentioned herein refers to one or more images or a video including multiple images that are continuous in time series) of the at least one predicted position may be acquired by one or more image sensors (for example, a camera). Then at least one lip mover, i.e. a person whose lips are moving, can be determined based on the acquired images. Then, when determining the location and audio signal of each speaker, the sound signal collected by the sound sensor can be separated according to the lip movement direction of each lip mover, and the speaker's location and audio signal can be output. Of course, the position information of the speaker can also be directly determined according to the position of the lips of the lip mover in the image.

By determining at least one predicted location, the image sensor can be instructed to acquire an image more efficiently and accurately. In addition, in the method according to the embodiment of the present disclosure, image recognition can be combined with voice recognition; for example, voice recognition can be performed in a targeted manner according to the result of lip movement recognition, so that even in the case of high noise background, it is also possible to obtain a high voice recognition rate.

In another embodiment, for example, one or more types of at least one sensor, such as a human proximity sensor, a human activity detector, a pressure sensor, etc., may be placed at each predetermined location in a predetermined environment. Sensing information of at least one placed sensor can be received, and then at least one predicated location can be determined according to the received sensing information. Then, one or more image sensors can be controlled or instructed to acquire images of the determined at least one predicted location. At least one lip mover can then be determined based on the acquired image. Then, when determining the location and voice signal of each speaker, the sound signal collected by the sound sensor can be separated according to the lip movement direction of each lip mover, and the speaker's location and voice signal can be output. In this embodiment, through the combination of the image sensor information, i.e. image or video, and other types of sensor information, detection errors based on only image detection results due to insufficient light can be avoid, and detection errors based on only non-image sensor information (for example, in the case of using only a pressure sensor, a heavy object on the seat may be wrongly determined as a person in the seat; in the case of using only an infrared sensor, the animal may be wrongly determined as a person) can also be avoided.

For example, at least one pressure sensor may be installed at at least one preset seat (for example, each seat in a vehicle). Then, the pressure value collected by each pressure sensor can be obtained, and accordingly, the aforementioned at least one predicted location can include each preset seat of which the sensed pressure value is greater than a threshold. That is, when the pressure value at a certain seat is greater than the preset threshold, it can be initially determined that there may be a person on the seat. Then, one or more image sensors can be controlled or instructed to only capture images of the determined at least one predicted location, which can be analyzed. As a result, it is possible to effectively reduce detection errors in image detection, such as detection errors due to insufficient light, and to omit or reduce the processing related to living-face detection in image detection, thereby helping to improve detection efficiency and accuracy and reduce the complexity and cost of processing.

The present disclosure is not limited to a specific image acquisition method and/or a specific image analysis method. For example, each camera can be controlled to acquire images of one or more corresponding areas, and various images can be detected or analyzed in parallel by using neural networks, support vector machines, or the like; one or more cameras can also be controlled to acquire a complete image or video that covers all the locations or areas. Then neural networks, support vector machines, etc., can be used to perform image detection or analysis on the complete image.

According to different embodiments, the lip movement recognition can be directly based on the acquired images. Alternatively, after detecting a person based on the acquired image, the angle, focal length, etc., of the image sensor can be adjusted to make the image sensor more accurately align with the person, and the image sensor can be controlled to acquire images of the person or the person's face again, and then lip movement recognition can be performed based on the second acquired images, so as to more accurately determine the lip movement direction of one or more lip movers.

In one embodiment, the sound signal collected by the sound sensor (for example, a microphone) may be separated according to the lip movement direction of each lip mover, and the speaker's location and voice signal may be output.

In one embodiment, the location and voice signal of each speaker can be further combined with voice signal processing, so as to effectively avoid or reduce misjudgments in lip movement recognition.

For example, the sound signal collected by a sound sensor (for example, a microphone) can be enhanced in the direction of each lip mover's lip movement. Through separating the enhanced sound signal, a separated signal corresponding to each lip mover can be obtained. Then the separated signal with energy greater than a threshold can be determined as the speaker's voice signal. As a result, it can be avoided that, for example, a lip mover who is eating or yawning is also determined as the speaker, thereby improving the accuracy of lip movement recognition.

In one embodiment, the sound signal collected by the sound sensor may be subjected to noise reduction processing before the sound separation. For example, high-pass filtering can be used to remove low-frequency noise, and echo cancellation technology can also be used to eliminate loudspeaker playback interference, and so on.

In one embodiment, in response to the voice instruction of the speaker of any voice instruction, the corresponding audio and at least one loudspeaker corresponding to the area where the speaker of any voice instruction is located among the plurality of loudspeakers can be determined, and the at least one loudspeaker can be controlled to play the corresponding audio with corresponding playing parameters.

According to different embodiments, the loudspeakers S2 and S3 can be controlled differently. For example, loudspeakers S2 and S3 may be controlled to be in a mute state; S2 and S1 may also be controlled to play navigation sounds, and S4 and S3 may be controlled to play music together; S2 and S4 may also be controlled to play music together with S3; S2 may also be controlled to be in a mute state, and the volume of S4 and S3 may be controlled to be different (for example, lower than the volume of S3) to play music; and so on.

For example, if it is subsequently detected that P2 issues the voice instruction "stop playing" and P3 issues the voice instruction "play music", then in step S130, S3 can be controlled to stop playing, and S4 can be controlled to start playing music with appropriate volume and/or sound effects. As a result, zoned playback in response to voice instructions can be realized.

In one embodiment, the sound field measurement can be performed on the area where the speaker of any voice instruction is located, and the corresponding playback parameters of each loudspeaker can be determined according to the result of the sound field measurement. As a result, it is possible to obtain a good playback effect and ensure that the audio played for each area does not interfere with each other.

For example, for a vehicle-mounted environment, the sound field measurement can be implemented for each area corresponding to each seat in the vehicle, and a set of loudspeaker parameters can be obtained. The set of parameters can provide the output sound pressure level at the seat or playing area corresponding to each loudspeaker with a maximum difference relative to the sound pressure level at other seats or playing areas. In addition, one or more adjustments can be performed to ensure that the optimized results of the parameters are obtained.

In one embodiment, such sound field measurement and parameter debugging or adjustment may be performed offline, for example, before the vehicle leaves the factory or before the indoor smart audio system is used.

In another embodiment, such sound field measurement and parameter debugging or adjustment may also include an online real-time operation. For example, a corresponding operation interface may be provided to allow a user (such as a driver and/or passenger of a vehicle) to adjust the parameters of the loudspeaker, and the loudspeaker and microphone may also be used to dynamically measure the sound field and adjust or fine-tune the parameters in real time.

Through an exemplary method according to an embodiment of the present disclosure, different audios can be played for different areas in a predetermined space such as a vehicle-mounted space, and different audios played for different areas (at least the main listening areas) do not interfere with each other.

Exemplary Apparatus

Figure 5:
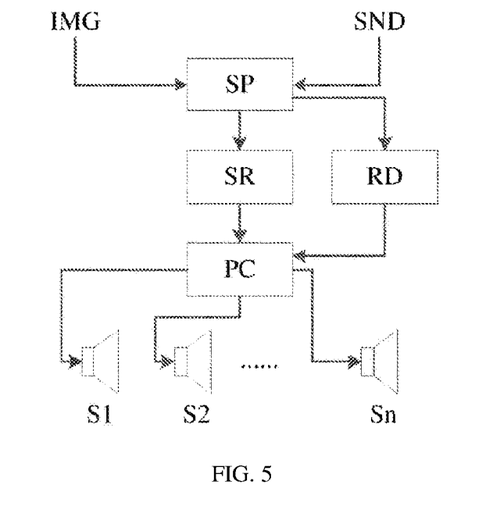
FIG. 5 shows an exemplary device according to an embodiment of the present disclosure.

As shown in FIG. 5, an example apparatus according to an embodiment of the present disclosure may include a sound source localization module SP, an area determination module RD, a voice recognition module SR, and a playback control module PC.

The sound source localization module SP can be configured to determine the location and voice signal of each speaker. In an embodiment, the sound source localization module SP may include one or more processors such as general-purpose processors, field programmable gate arrays, ARM processors, or the like, so as to determine the location and voice signal of each speaker according to the received images and sounds. The sound source localization module SP may also be configured to transmit the determined voice signal of each speaker to the voice recognition module SR. In addition, the sound source localization module SP may also be configured to transmit the determined position information of each speaker to the area determination module RD.

The area determination module RD can be configured to determine the area where each speaker is located according to the location information of each speaker. In an embodiment, the area determination module RD may include one or more processors such as general-purpose processors, field programmable gate arrays, ARM processors, and the like. In addition, the area determination module RD can also be configured to transmit the determined area information of each speaker to the playback control module PC.

The voice recognition module SR may be configured to determine the voice instruction corresponding to each voice signal. In one embodiment, the voice recognition module SR may include one or more processors such as general-purpose processors, field programmable gate arrays, ARM processors, and the like, so as to perform speech recognition based on the voice signals from the sound source localization module SP. In addition, the voice recognition module SR can also be configured to transmit each recognized voice instruction to the playback control module PC.

The playback control module PC may be configured to control the multiple loudspeakers to play the audio indicated by the corresponding voice instruction respectively for the area where the speaker of each voice instruction is located.

In one embodiment, the playback control module PC may include one or more processors such as general-purpose processors, field programmable gate arrays, ARM processors, and the like, so as to determine the audio corresponding to the speaker of each voice instruction and the corresponding playback parameters based on the area information of the speaker of the voice instruction from the area determination module RD and voice instruction from the voice recognition module SR, and to select one or more loudspeakers from the loudspeakers S1 to Sn for playback based on the location information of the speaker of each voice instruction.

In one embodiment, the sound source localization module SP, the area determination module RD, the voice recognition module SR, and the playback control module PC are interconnected via a bus, and the playback control module PC can be connected to all loudspeakers in a wired or wireless manner.

It should be understood that the structure shown in FIG. 5 is only an example of an apparatus according to an embodiment of the present disclosure. For example, the apparatus according to the embodiment of the present disclosure may further include other components or modules, or may have other structures.

Figure 6:
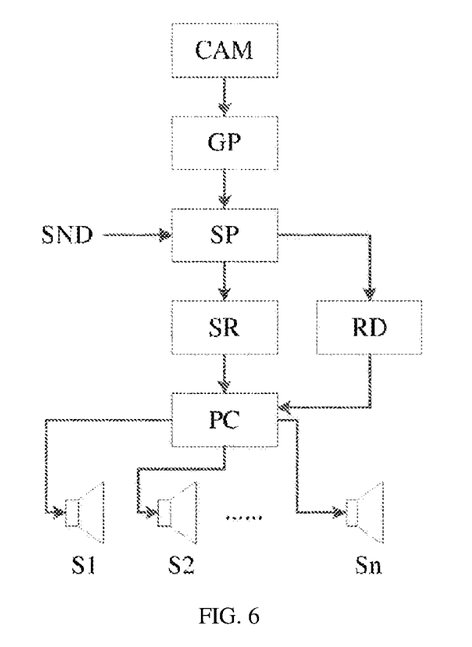
FIG. 6 shows an exemplary device according to an embodiment of the present disclosure.

For example, as shown in FIG. 6, based on the example structure of FIG. 5, the apparatus according to an embodiment of the present disclosure may further include an image processing module GP dedicated to image processing (e.g., image recognition, image detection, or the like).

In one embodiment, the image processing module GP may include one or more processors of types such as general-purpose processors, image processors, field programmable gate arrays, and ARM processors. In other embodiments, for example, in the case of using artificial neural networks and other artificial intelligence technologies for image processing, the image processing module GP may also include a dedicated artificial intelligence chip, a computing acceleration engine, and the like.

The image processing module GP may include an interface capable of connecting one or more image sensors CAM (such as cameras), so as to receive image data or video data acquired by one or more image sensors CAM and send control instructions to one or more image sensors CAM. According to different embodiments, such interface may be any form of wired or wireless interface. In another embodiment, the image processing module GP itself may include one or more image sensors.

Figure 7:
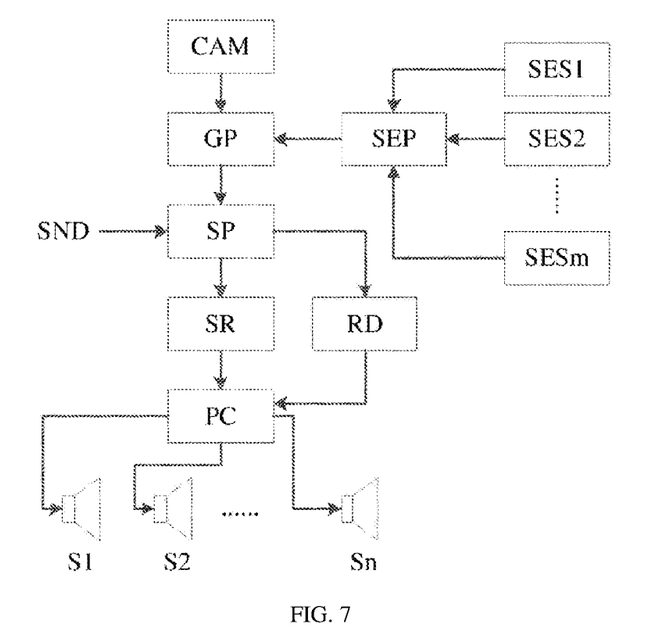
FIG. 7 shows an exemplary device according to an embodiment of the present disclosure.

For example, as shown in FIG. 7, based on the example structure of FIG. 6, the apparatus according to the embodiment of the present disclosure may further include a sensing information processing module SEP.

The sensing information processing module SEP can be connected to one or more sensors SES1 to SESm in a wired or wireless manner, so as to collect the sensing information from each sensor and process and analyze the collected sensing information. For example, the collected sensing information is converted from analog to digital and compared with a predetermined threshold, and so on. As mentioned above, such sensors SES1 to SESm may be at least one sensor of one or more types such as a human proximity sensor, a human activity detector, a pressure sensor, and the like.

Depending on the type of sensing information to be parsed, the sensing information processing module SEP may have different circuit implementations. For example, the sensing information processing module SEP may include one or more processors such as general-purpose processors, graphic processors, field programmable gate arrays, and ARM processors. For example, in the case of a pressure value, the sensing information processing module SEP may also include one or more analog-to-digital converters and one or more digital comparators to compare the sensed pressure value with a predetermined threshold.

In one embodiment, the sensing information processing module SEP may be configured to send an enable signal to the image processing module GP when the sensed information satisfies a predetermined condition (for example, the sensed pressure value is greater than a threshold).

In another embodiment, the sensing information processing module SEP may also be configured to send information related to the sensing position or sensing region to the image processing module GP. For example, in a case where the sensing information processing module SEP determines that the pressure value from the pressure sensor SES2 exceeds the threshold value, the sensing information processing module SEP may send an enable signal to the image processing module GP while sending position or region relevant information, such as an ID, position of the pressure sensor SES2, or the like, to the image processing module GP so that the image processing module GP can more accurately capture images.

Figure 8:
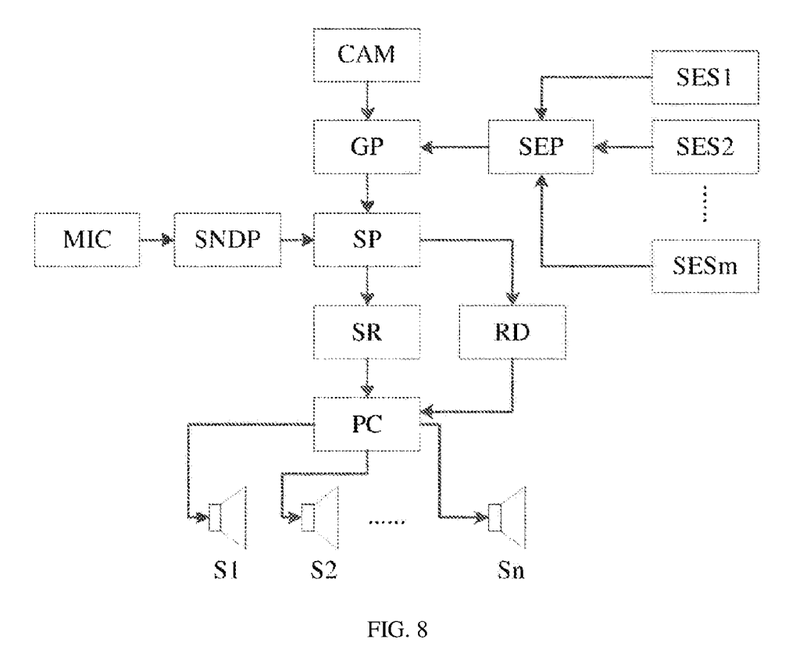
FIG. 8 shows an exemplary device according to an embodiment of the present disclosure.

For example, on the basis of any of the example structures of FIG. 5 to FIG. 7, the apparatus according to the embodiment of the present disclosure may further include a sound processing module SNDP. FIG. 8 shows an example of adding a sound processing module SNDP on the basis of the example structure of FIG. 7.

The sound processing module SNDP can be wired or wirelessly connected to one or more sound sensor MICs, and can be configured to perform processing such as noise reduction for the sound signals collected by the sound sensor MIC.

In one embodiment, the sound processing module SNDP may include one or more processors such as general purpose processors, field programmable gate arrays, and the like. In another embodiment, the sound processing module SNDP may also include components such as a high-pass filter, an adaptive filter, an energy detector, and a signal adder. In another embodiment, the sound processing module SNDP can also be coupled to the loudspeakers to facilitate echo cancellation.

According to different embodiments, the sound sensor MIC may include a sound collecting device such as an analog microphone, and may also include other components such as an analog-to-digital converter.

Figure 9:
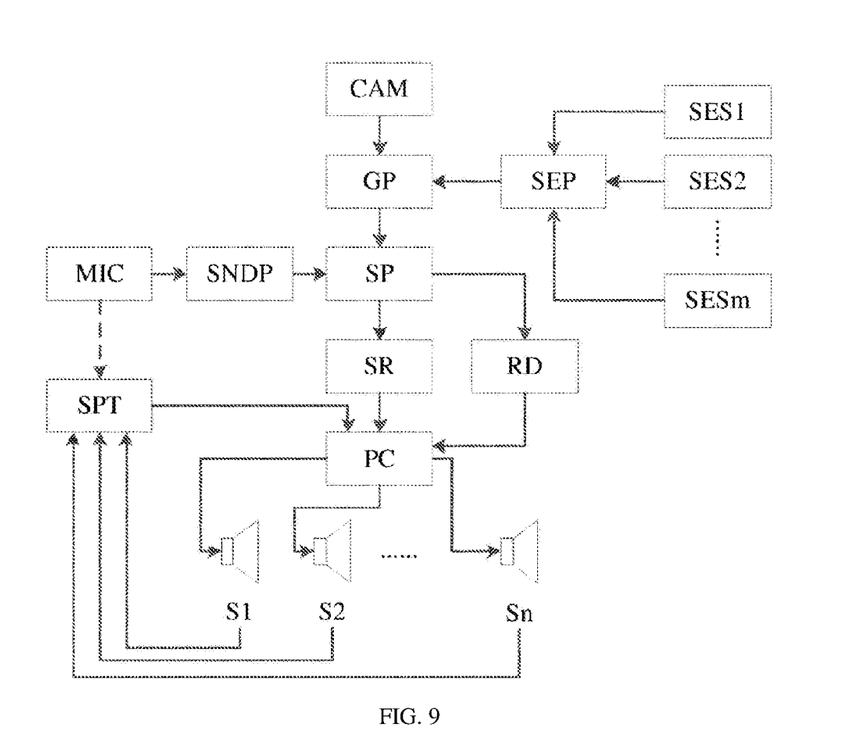
FIG. 9 shows an exemplary device according to an embodiment of the present disclosure.

For example, on the basis of any of the example structures in FIGS. 5 to 8, the parts related to setting and adjusting the playback parameters in the playback control module PC can be separated, and a loudspeaker parameter setting module SPT can be separately set. FIG. 9 shows an example of separately setting the loudspeaker parameter setting module SPT on the basis of the example structure of FIG. 8.

The loudspeaker parameter setting module SPT can be configured to set/adjust and save a set of loudspeaker parameters according to the results of the sound field measurement. This set of parameters can make the difference between the output sound pressure levels of each loudspeaker for the corresponding seat or playing area relative to other seats or playing areas become maximum. In one embodiment, the sound processing module SNDP may include one or more processors such as general-purpose processors, field programmable gate arrays, and the like.

In one embodiment, the loudspeaker parameter setting module SPT may also be configured to perform sound field measurement based on feedback from the loudspeaker and/or microphone.

In another embodiment, the loudspeaker parameter setting module SPT may also include an interface capable of receiving input devices such as a keyboard, touch screen, buttons, knobs, etc., so as to allow the user to manually adjust the loudspeaker parameters.

According to different embodiments, the modules mentioned above may be individual circuits or chips interconnected by wires or buses, or may be integrated in a chip, or may be disposed that some modules are integratedly implemented and other modules are integratedly implemented. In addition, the above-mentioned modules can be connected to image sensors, sound sensors, loudspeakers, and other various sensors through various wired interfaces or wireless interfaces such as universal serial bus interface and infrared interface.

Figure 10:
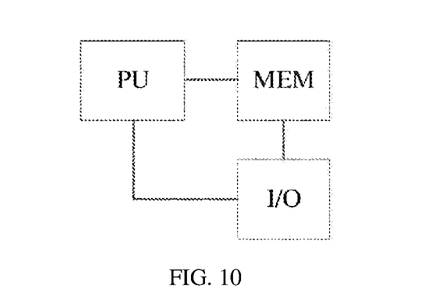
FIG. 10 shows an exemplary apparatus according to an embodiment of the present disclosure.

In another embodiment, as shown in FIG. 10, one or more processors PU, such as general-purpose processors, field programmable gate arrays, ARM processors, etc., may be used to implement the functions of the above-mentioned modules. In one embodiment, the processor PU may be configured to be able to execute the steps in the methods according to various embodiments of the present disclosure described in the "Exemplary Methods" section above.

In addition, as shown in FIG. 10, the example apparatus may also include a memory MEM used to store executable instructions and/or related data of the processor PU, and an interface I/O used for interconnectivity between devices such as an image sensor, a sound sensor, a loudspeaker, and various other sensors. According to different embodiments, the interface I/O may be various wired interfaces or wireless interfaces such as universal serial bus interface and infrared interface.

Exemplary Electronic Device

The embodiment of the present disclosure may also be an electronic device that allows controlling multiple loudspeakers to play audios. The electronic device may include any exemplary apparatus according to the embodiment of the present disclosure, for example, the exemplary apparatus shown in FIG. 10.

Exemplary computer program product and computer readable storage medium

In addition to the above methods and devices, the embodiments of the present disclosure may also be computer program products comprising program instructions that, when run by, for example, a processor, cause the processor to execute any of the steps in the method according to an embodiment of the present disclosure described in the "Exemplary Methods" section.

Regarding the computer program product, the program codes for carrying out the operations of embodiments of the present disclosure can be complied in any combination of one or more programming languages, which comprise object-oriented programming languages, such as Java, C++, etc., as well as conventional procedural programming language, such as "C" language or similar programming language. Program codes can be executed on a user computing device completely, executed on a user device partially, executed as an independent software package, executed on a user computing device partially while executed on a remote computing device partially, or executed on a remote computing device or server completely.

In addition, the embodiment of the present disclosure may also be a computer-readable storage medium, such as a computer-readable non-transitory storage medium, on which program instructions are stored, upon execution of which by, for example, a processor such that the processor executes the steps in any method according to the embodiment of the present disclosure described in the above-mentioned "Exemplary Method" section of this disclosure.

The computer-readable storage medium may adopt any combination of one or more readable media. The readable medium may be a readable signal medium or a readable storage medium. The readable storage medium may comprise, but is not limited to, a system, a device, or an equipment of an electrical, magnetic, optical, electromagnetic, infrared, or semiconductor, or a combination of any of the above. More specific examples (non-exhaustive list) of readable storage media comprise: electrical connections with one or more wires, portable disks, hard disks, random access memory (RAM), read only memory (ROM), erasable type programmable read-only memory (EPROM or flash memory), optical fiber, portable compact disk read-only memory (CD-ROM), optical memory, magnetic memory, or any suitable combination of the above.

The basic principles of the present disclosure are described above in conjunction with specific embodiments. However, it should be pointed out that the advantages, merits, effects, etc. mentioned in the present disclosure are merely examples and not limitations, and these cannot be considered as essential for each embodiment of the present disclosure. In addition, specific details disclosed hereinabove are only for the purpose of explanation and ease of understanding, rather than limitations, and it is not necessary for the present disclosure to be implemented by using the specific details hereinabove.

The block diagrams of the device, apparatus, equipment, and systems involved in the present disclosure are merely illustrative examples and are not intended to require or imply that they must be connected, arranged, and configured in the manner shown in the block diagrams. As those skilled in the art will recognize, these device, apparatus, equipment, and systems can be connected, arranged, and configured in any manner. Terms such as "comprising", "including", "having", etc. are to be construed in an inclusive sense, meaning "comprising but not limited to", and can be used interchangeably. The terms "or" and "and" used herein refer to the term "and/or" and can be used interchangeably, unless the context clearly indicates otherwise. The term "such as" used herein refers to the phrase "such as but not limited to", and can be used interchangeably.

In addition, in the apparatuses, devices and methods of the present disclosure, each component or each step can be decomposed and/or recombined. These decomposed and/or recombined ones should be regarded as equivalent solutions of the present disclosure.

Herein, the modifiers without quantifiers, such as "first" and "second", are intended to be used to distinguish different elements, components, circuits, modules, apparatuses, or steps, rather than to emphasize order, positional relationship, importance, priority, or the like, while the modifiers with quantifiers, such as "the first one" and "the second one", may be used to emphasize order, positional relationship, importance, priority, and so on, of different elements, components, circuits, modules, apparatuses, or steps.

The above description of the disclosed aspects is provided to enable a person skilled in the art to achieve or make use of the present disclosure. Various modifications to these aspects are very obvious to those skilled in the art, and the general principles defined herein can be applied to other aspects without departing from the scope of the present disclosure. Therefore, the present disclosure is not intended to be limited to the aspects shown herein, but shall be expounded in accordance with the broadest scope consistent with the principles and novel technical features disclosed herein.

The above description has been given for the purposes of illustration and description. However, the embodiments of the present disclosure are not intended to be limited to the forms disclosed herein. Although a number of example aspects and embodiments have been discussed above, those skilled in the art will make certain variations, modifications, changes, additions, and sub-combinations thereof.

What is claimed is:

1. A method for controlling audio playback of multiple loudspeakers, wherein the method comprises:
   determining location information of each talker of a plurality of talkers and and a voice signal issued by each talker;
   determining an area where each talker is located according to the location information of each talker;
   determining a voice instruction corresponding to each voice signal; and
   controlling the multiple loudspeakers to play audio indicated by the corresponding voice instruction for the area where a stalker of each voice instruction is located respectively,
   wherein controlling the multiple loudspeakers to play audio indicated by the corresponding voice instruction respectively for the area where the talker of each voice instruction is located, comprises:
      in response to receipt of the voice instruction of the talker of any of the voice instruction, determining a corresponding audio content and at least one loudspeaker of the multiple loudspeakers corresponding to the area where the talker of any of the voice instruction is located;
      performing a sound field measurement in the area where the talker of any of the voice instruction is located, determining corresponding playback parameters of the at least one loudspeaker based on a result of the sound field measurement, wherein the playback parameters enable to provide an output sound pressure level at a corresponding playing area corresponding to each loudspeaker with a maximum difference relative to a sound pressure level at other playing areas; and
      controlling the at least one loudspeaker to play the corresponding audio content with corresponding playback parameters.

2. The method according to claim 1, further comprising:
   determining at least one predicted location;
   acquiring an image of the at least one predicted location captured by an image sensor;
   determining at least one lip mover based on the acquired images; and
   determining a single talk from the at least one lip mover.

3. The method according to claim 2, wherein determining the at least one predicted location comprises:
   receiving sensing information from at least one sensor; and
   determining the at least one predicted location based on the received sensing information.

4. The method according to claim 3, wherein the at least one sensor includes at least one pressure sensor at at least one preset seat, and the at least one predicted location includes each preset seat at which a pressure value sensed by the at least one pressure sensor is greater than a threshold.

5. The method according to claim 2, wherein determining the location information and the issued voice signal of each talker comprises:
   enhancing a sound signal collected by a sound sensor in a direction of lip movement of each lip mover;
   obtaining a separated signal corresponding to each lip mover by separating the enhanced sound signal; and
   determining the separated signal with energy greater than a threshold as being the voice signal issued by each talker.

6. An electronic device, wherein the electronic device comprises:
   a processor configured to execute a method for controlling audio playback of multiple loudspeakers; and
   a memory configured to store executable instructions of the processor,
   wherein the method comprises:
   determining location information of each talker of a plurality of talkers and and a voice signal issued by each talker;
   determining an area where each talker is located according to the location information of each talker;
   determining a voice instruction corresponding to each voice signal; and
   controlling the multiple loudspeakers to play audio indicated by the corresponding voice instruction for the area where each talker of each voice instruction is located respectively,
   wherein controlling the multiple loudspeakers to play audio indicated by the corresponding voice instruction respectively for the area where the talker of each voice instruction is located, comprises:
      in response to receipt of the voice instruction of the talker of any of the voice instruction, determining a corresponding audio content and at least one loudspeaker of the multiple loudspeakers corresponding to the area where the talker of any of the voice instruction is located;
      performing a sound field measurement in the area where the talker of any of the voice instruction is located, determining corresponding playback parameters of the at least one loudspeaker based on a result of the sound field measurement, wherein the playback parameters enable to provide an output sound pressure level at a corresponding playing area corresponding to each loudspeaker with a maximum difference relative to a sound pressure level at other playing areas; and
      controlling the at least one loudspeaker to play the corresponding audio content with corresponding playback parameters.

7. The electronic device according to claim 6, wherein the method further comprises:
   determining at least one predicted location;
   acquiring an image of the at least one predicted location captured by an image sensor;

determining at least one lip mover based on the acquired images; and determining a single talker from the at least one lip mover.

8. The electronic device according to claim 7, wherein determining the at least one predicted location comprises:

receiving sensing information from at least one sensor; and determining the at least one predicted location based on the received sensing information.

9. The electronic device according to claim 8, wherein the at least one sensor includes at least one pressure sensor at at least one preset seat, and the at least one predicted location includes each preset seat at which a pressure value sensed by the at least one pressure sensor is greater than a threshold.

10. The electronic device according to claim 7, wherein determining the location information and the issued voice signal of each talker comprises:

enhancing a sound signal collected by a sound sensor in a direction of lip movement of each lip mover;

obtaining a separated signal corresponding to each lip mover by separating the enhanced sound signal; and determining the separated signal with energy greater than a threshold as being the voice signal issued by each talker.

11. A non-transitory computer-readable storage medium, wherein the medium has program instructions stored thereon that when executed by a computer execute a method for controlling audio playback of multiple loudspeakers, wherein the method comprises:

determining location information of each talker and a voice signal issued by each talker;

determining an area where each talker of a plurality of talkers and located according to the location information of each loudspeaker;

determining a voice instruction corresponding to each voice signal; and controlling the multiple loudspeakers to play audio indicated by the corresponding voice instruction for the area where a talker of each voice instruction is located respectively, wherein controlling the multiple loudspeakers to play audio indicated by the corresponding voice instruction respectively for the area where the talker of each voice instruction is located, comprises:

in response to receipt of the voice instruction of the talker of any of the voice instruction, determining a corresponding audio content and at least one loudspeaker of the multiple loudspeakers corresponding to the area where the talker of any of the voice instruction is located;

performing a sound field measurement in the area where the talker of any of the voice instruction is located, determining corresponding playback parameters of the at least one loudspeaker based on a result of the sound field measurement, wherein the playback parameters enable to provide an output sound pressure level at a corresponding playing area corresponding to each loudspeaker with a maximum difference relative to a sound pressure level at other playing areas; and controlling the at least one loudspeaker to play the corresponding audio content with corresponding playback parameters.

12. The non-transitory computer-readable storage medium according to claim 11, wherein the method further comprises:

determining at least one predicted location;

acquiring an image of the at least one predicted location captured by an image sensor;

determining at least one lip mover based on the acquired images; and determining a single talker from the at least one lip mover.

13. The non-transitory computer-readable storage medium according to claim 12, wherein determining at least one predicted location comprises:

receiving sensing information from at least one sensor; and determining the at least one predicted location based on the received sensing information, or wherein the at least one sensor includes at least one pressure sensor at at least one preset seat, and the at least one predicted location includes each preset seat at which a pressure value sensed by the at least one pressure sensor is greater than a threshold.

14. The non-transitory computer-readable storage medium according to claim 12, wherein determining the location information and the issued voice signal of each talker comprises:

enhancing a sound signal collected by a sound sensor in a direction of lip movement of each lip mover;

obtaining a separated signal corresponding to each lip mover by separating the enhanced sound signal; and determining the separated signal with energy greater than a threshold as being the voice signal issued by each talker.

* * * * *